United States Patent [19]

Terashita

[11] Patent Number: 4,830,501
[45] Date of Patent: May 16, 1989

[54] METHOD OF CLASSIFYING COLOR ORIGINALS AND APPARATUS THEREOF

[75] Inventor: Takaaki Terashita, Kanagawa, Japan

[73] Assignee: Fuji Photo Film Co., Ltd., Kanagawa, Japan

[21] Appl. No.: 150,856

[22] Filed: Feb. 1, 1988

[51] Int. Cl.⁴ ............................................. G01J 3/50
[52] U.S. Cl. .................................. 356/402; 356/406; 356/407; 356/404; 355/204; 358/75; 364/526
[58] Field of Search ............... 356/402, 406, 407, 425, 356/404; 355/4, 14 E, 14 D; 358/75; 364/526

[56] References Cited

U.S. PATENT DOCUMENTS 4,239,374 12/1980 Tatsumi et al. ................... 355/14 E Primary Examiner—F. L. Evans
Attorney, Agent, or Firm—Sughrue, Mion, Zinn, Macpeak & Seas

[57] ABSTRACT

A method and apparatus for classifying color originals into at least color photographs and other colored articles such as color printed articles, letters, handwriting, art graphics or the like by detecting the reflection densities of divisions into which the color original is spatially divided, using light sensors having peak sensitivities at different wavelengths for at least one of the three primary colors. The reflection densities are compared to obtain a difference or a ratio thereof and based on the result of the comparison, the color originals are classified as color photographs or as other colored articles.

25 Claims, 15 Drawing Sheets

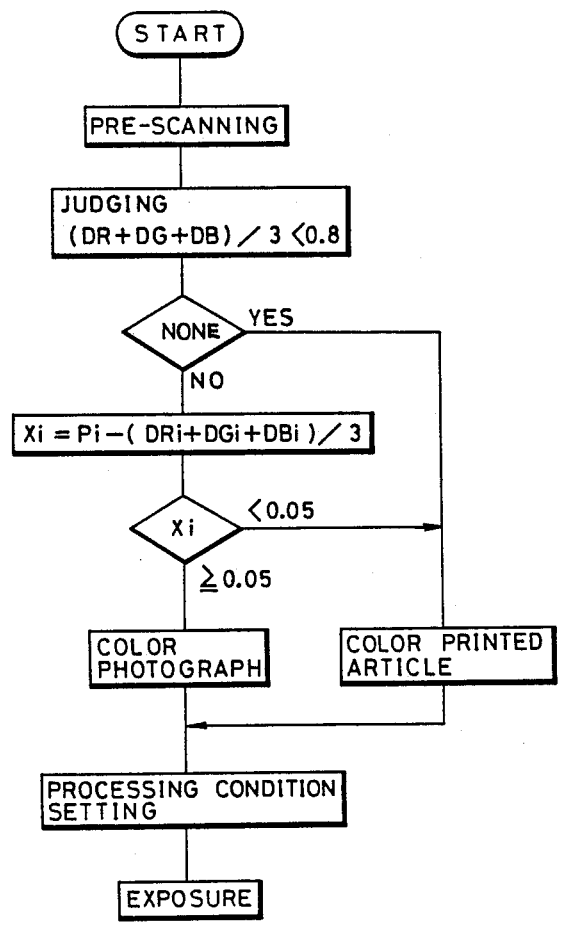

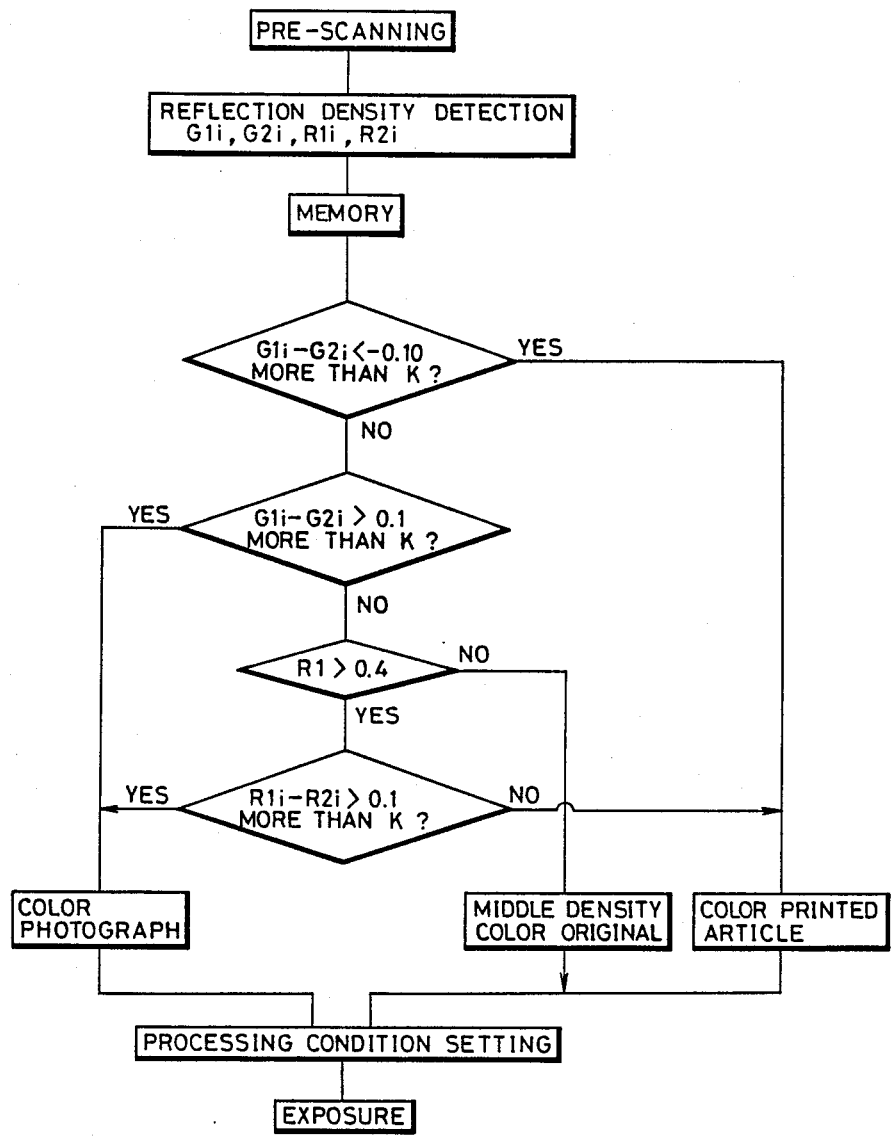

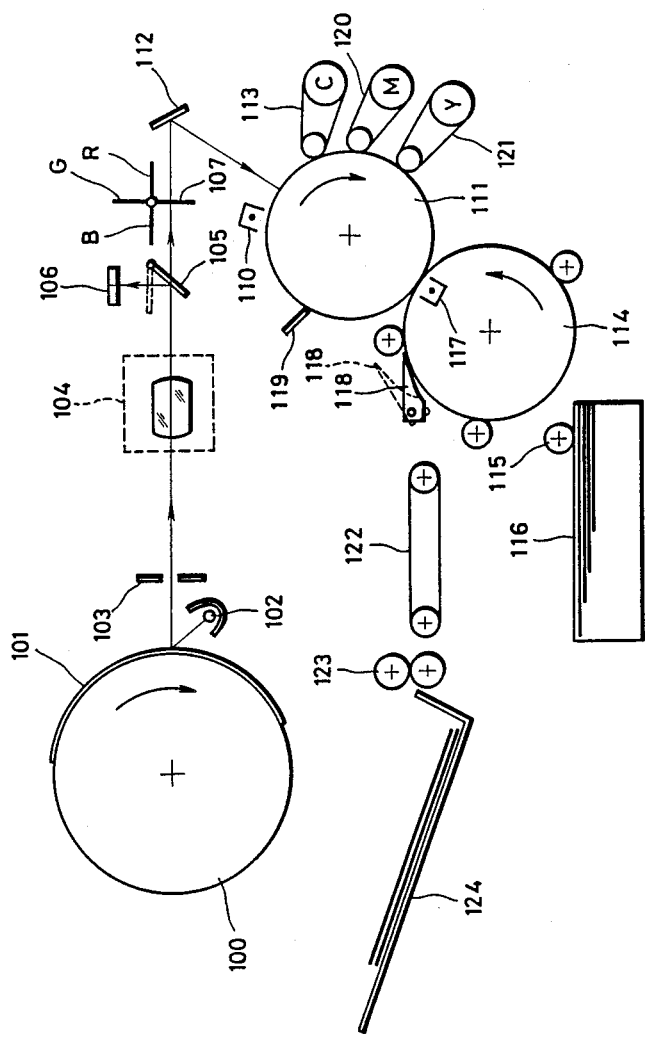

METHOD OF CLASSIFYING COLOR ORIGINALS AND APPARATUS THEREOF

BACKGROUND OF THE INVENTION

The present invention relates to a method and apparatus for classifying color originals from which color images are reproduced and more particularly to a method and apparatus for classifying color originals into at least color photographs and another color articles such as color printed articles, letters, illustrations, color art graphics and paintings according to their reflection densities.

In reproducing color images from color originals, color image reproducing machines such as electronics color image reproducing systems, ink-jet color printers, laser color printers, photographic color printers using reverse color papers or diffusion transfer type photosensitive materials, or heat sensitive copying machines, it is essential to reproduce a color image not only with proper color density but also with proper color balance. Generally used as color originals from which color images are reproduced are color photographs and color printed articles. When reproducing these color originals, even though same reproducing conditions are selected, the reproduced images tend to have different color densities and/or color balances owing to the differences between coloring materials for photographs and color printed articles or between the relative luminosity and the spectral sensitivity of image reproducing materials. For example, cyan and magenta inks used in making color printed articles have spectral density distributions widely overlapping on each other. In color image reproducing machines for making finished color images from color printed articles, an image reproducing condition is selected which restrains the density of magenta because color printed articles generally have a relatively high magenta density. When reproducing color images from color photographs using the reproducing conditions selected for color printed articles, the reproduced image tends to be too low in magenta density, resulting in a green tinted image.

In attempting to eliminate this undesirable color tint, the conventional color image reproducing machines are adapted to allow variance in the image reproducing conditions, such as the ratio of light components, by adjusting the three primary color filters, the exposures, the charging amounts, the development bias or the like according to the color originals, namely color photographs or color printed articles. For reproducing color images from color originals by the use of such conventional color image reproducing machines, an operator visually classifies the color originals into photographs and color printed articles and, according to the classified color originals, selects proper image reproducing conditions by operating condition selection keys.

One problem associated with the conventional color image reproducing machines is that the operator has to examine color originals for visible features such as the existence of printing dots. Because of recent advances in color printing technology, it is hard to visually determine the difference in image features between color photographs and color printed articles for, in particular, non-skilled operators.

OBJECT OF THE INVENTION

It is, therefore, an object of the present invention to provide a method and apparatus for accurately classifying color originals into at least color photographs and other color articles such as color printed articles.

It is another object of the present invention to provide a method and apparatus for classifying color originals into color photographs, color printed articles and other articles.

SUMMARY OF THE INVENTION

To achieve the above object, the present invention provides a method comprising the steps of measuring a color original to detect reflection values such as reflection light intensities or reflection densities of the color original by using first light sensitive measuring means having a peak sensitivity at a wavelength within a range of approximately 370 to 420 nm and second light sensitive measuring means having a sensitivity peak at a wavelength within the wavelength band of visible light rather than the above wavelength range, comparing the measured light reflection values of the first and second light sensitive measuring means, and, based on the result of the comparision of the two light reflection values, classifying color originals into color photographs, color printed articles and others. For comparison purposes, either the difference between the two measured light reflection values or a ratio of the two reflection values is utilized. The light reflection value may be detected as reflected light intensity or the reflection density of the color original.

In order to detect the light reflection values of the color original, it is possible to detect reflection light from the whole area of the color original, from a large number of points of the color original, or from two dimensional smaller divisions into which the color original is spatially divided. The reflection values can be detected in the form of a reflection light intensity or a reflection density for any one of three primary colors, or a mean value of the reflection values for the three primary colors. The color original is examined based on the reflection values and classified as a color photograph when the color original has, for example, a density difference between the two reflection values which is larger than a predetermined value. According to the classification outcome, the color original image reproducing apparatus is automatically set to a proper processing condition for image reproduction.

According to a preferred embodiment of the present invention, the color original is measured to detect reflection values by using two light sensitive means having peak sensitivities at different wavelengths for one of the three primary colors. Based on the difference between or the ratio of the two measured reflection values, the color original is classified to be a color photograph or to be a color printed article.

For finer classification, the color original is measured to detect reflection values from smaller divisions into which the color original is spatially divided, using two light sensitive means having peak sensitivities at different wavelengths for one of the three primary colors and two light sensitive means having peak sensitivities at different wavelengths for another of the three primary colors. Each pair of the detected reflection values is compared for each division and, based on the compared results of the two pairs, the color original is examined and classified.

According to another preferred embodiment of the present invention, when the color original includes a color image with a lower color density, the color original is measured to detect reflection light at a wavelength between 370 and 430 nm for classification purposes. When the color original includes an image with a relatively high or high color density, the color original is measured to detect reflection light using at least two light sensors having different spectral sensitivities for the same color, the detected values being compared with each other so as to classify the color original as a color photograph or a color printed article.

For more fine classification of color originals, the color original is measured to detect reflection values using two light sensitive means having peak sensitivities at different wavelengths for each of the three primary colors. The two measured reflection values are compared by color, and, based on comparisons for the three primary colors, the color original is examined and classified.

BRIEF DESCRIPTION OF THE DRAWINGS

The invention will be described with reference to embodiments shown in the accompanying drawings, in which:

FIG. 9 is a flow chart showing an example of the classification of color originals in the apparatus of FIG. 2;

FIG. 16 is a schematic illustration of a third embodiment of the present invention;

FIG. 17 is a flow chart similar to FIG. 9 showing an example of classifying color originals with the apparatus of FIG. 16;

FIG. 23 is a another example of a color image reproducing machine embodying the present invention.

DETAILED DESCRIPTION OF THE INVENTION

Figure 1:
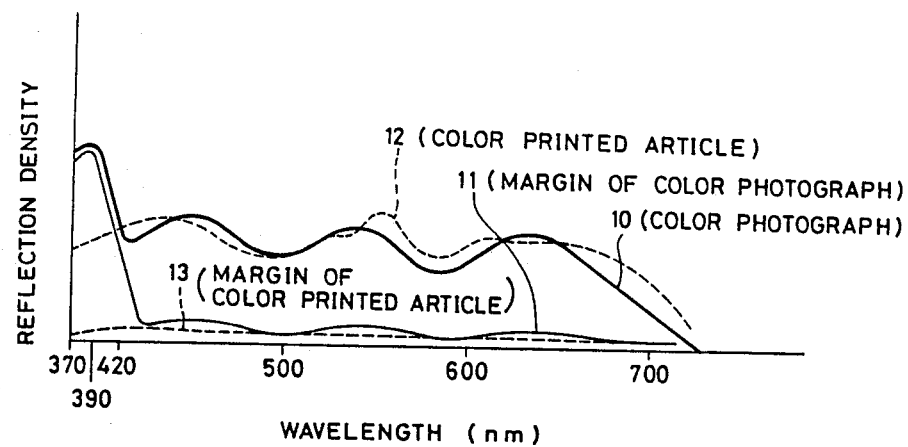
FIG. 1 is a graph showing spectral reflection density distributions for various color originals.

Referring now to FIG. 1, shown therein are spectral reflection density distribution curves. The curves 10 and 12 show spectral reflection density distributions of images having low density and standard color balance for color photographs and color printed articles, respectively. The curves 11 and 13 show spectral reflection density distributions of white margins for color photographs and color printed articles. As is apparent from the curve 12, the reflection density distribution of the color printed article has its peak in the green color range.

The color photograph with low density has a peak reflection density for violet at a wavelength of approximately 390 nm. On the other hand, the color printed article of low density exhibits an ordinary distribution pattern in this same frequency range. Based on these spectral characteristics of color photographs and color printed articles, color originals can be classified into two groups, color photographs and color printed articles, by detecting the reflection densities thereof. For this classification, the color original is measured to detect densities for violet or ultraviolet and visible light other than violet. From the detected densities, a density difference between, or a ratio of, the two densities is obtained to determine whether the color original is a color photograph or a color printed article.

Figure 3:
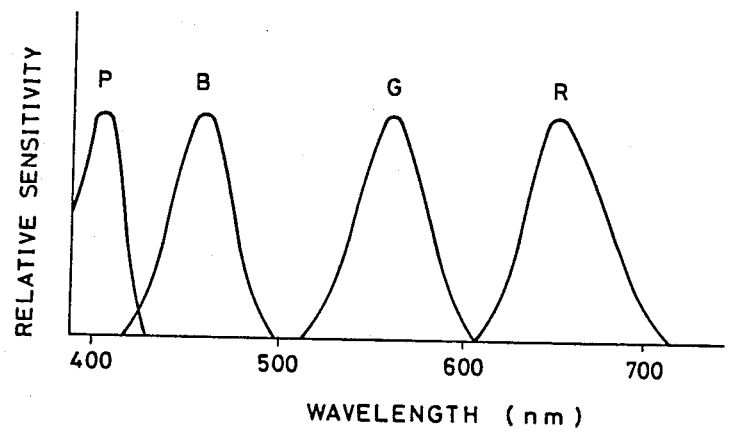
FIG. 3 is a graph showing relative spectral sensitivities of various light detecting means.
Figure 2:
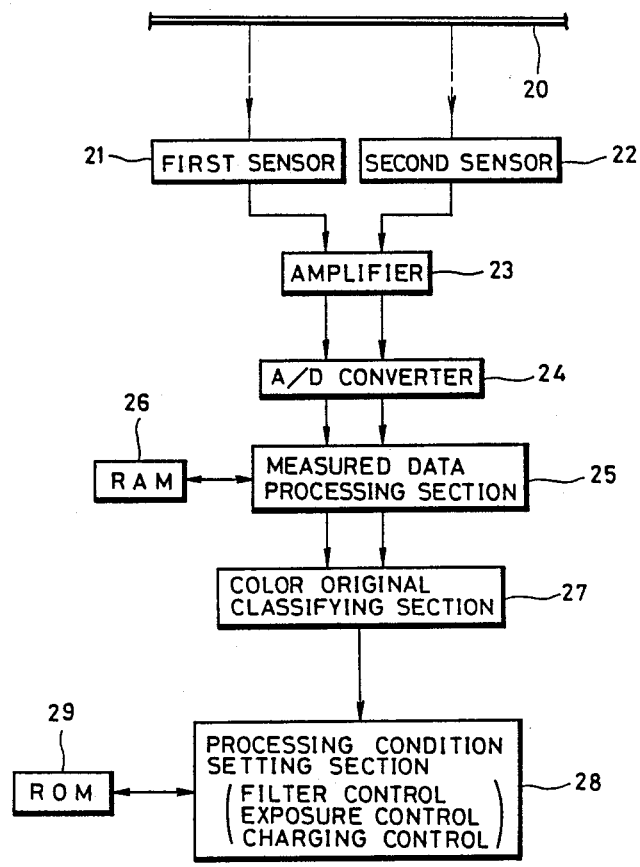
FIG. 2 is a block diagram showing a first preferred embodiment of the present invention.

Reference is now had to FIG. 2; shown therein is the essential structure of the present invention. Prior to color image reproduction, a color original 20 is measured to detect reflection densities for three primary colors, namely blue, green and red. For this measurement, first and second light sensors 21 and 22 are used to receive reflected light from the color original 20. As is shown in FIG. 3, the first light sensor 21 has a spectral sensitivity distribution having a peak at a wavelength between approximately 370 and 420 nm as shown by a curve P. The second light sensor 22 has one of the spectral sensitivity distributions for blue, green and red shown by curves B, G and R, respectively. As the second light sensor 22, three light sensors having spectral sensitivity distributions as shown by curves B, G and R, respectively may be used in combination to detect the mean density of blue, green and red of the color original 20. Alternatively, the first and second light sensors 21 and 22 may be replaced by a single light sensor having a sensitivity distribution similar to the luminosity.

Output signals from the first and second light sensors 21 and 22 are, after amplification by an amplifier 23, converted into density signals by an A/D converter 24. The two density signals are sent to a RAM 26 through a measured data processing section 25. After measurement, the measured data processing section 25 reads out the two density signals from the RAM 26 to calculate the difference between them. The resultant difference is transmitted to a color original classifying section 27 to determine whether the original is a color photograph or a color printed article.

Based on this classification, a processing condition setting section 28 selects proper processing conditions for the color original with reference to data on proper processing conditions memorized in a ROM 29. According to the selected processing conditions, an image reproducing apparatus is controlled to provide a reproduced image with favorable image quality. As control factors in this processing there are generally color filter regulation, exposure control, electric charge, developing dyes or the like which influence the color density and color balance of the reproduced image. In more detail, the processing conditions, in addition to the control of the above mentioned reproduction conditions, includes the selection of a proper reproducing paper among papers having different gradations, image forming dyes, and image areas; selection and control of developing conditions such as the developing steps and developing times; selection and control of the illumination light for illuminating the color original; gradation control via secondary exposure; and image quality control over the scanned image such as color reproductivity, tone reproductivity and image sharpness.

Color original classifications according to the present invention will be described hereinafter. Letting the color density detected by the first light sensor 21 having the sensitivity distribution shown by the curve P in FIG. 2 be designated as DP and the color density detected by the second light sensor 22 be denoted as DA, the color original 20 can be classified by the use of the following conditions:

$$DP - DA \geqq A \quad (1)$$

$$DP - DA < A \quad (2)$$

The color original 20 is determined to be a color photograph when satisfying the condition (1) and to be a color printed article when satisfying the condition (2). The threshold value A takes a value of, for example, 0.05.

Alternatively, if blue, green and red light sensors are used in combination as the second light sensor 22, the color density DA is obtained by the following equation:

$$DA = (DR + DG + DB)/3$$

wherein DR, DG and DB are the color densities for red, green and blue, respectively.

It is permissible, if desired, to obtain the color density DA by using the following equation in which weighted color densities are utilized:

$$DA = (a \cdot DR + b \cdot DG + c \cdot DB)/K$$

wherein a, b and c are weighting coefficients and K is the sum of the weighting coefficients a, b and c. For example, the weighting coefficients may take values 0.1, 0.5 and 0.4, respectively.

It is to be noted that, in the above classification, if color densities DR, DG and DB of the points or divisions into which the color original is divided satisfy the following condition, these color densities are excluded in classifying the color original:

$$DR - (DG - DG)/2 > 0.3$$

The above described embodiment of the present invention has been directed to the case where the color original is measured to detect color densities over the whole area. In the case of forming a reproduced image by slit exposure by scanning the color original lengthwise with transverse line illumination, the color original is spatially divided into smaller divisions by periodically converting the amplified output signals into density signals, so as to detect density signals DR, DG and DB for each division spatially divided. The color original classification is effected by sampling minimum values of DR, DG, DG and DP at the smaller divisions and comparing the differences with the threshold value A.

Figure 4:
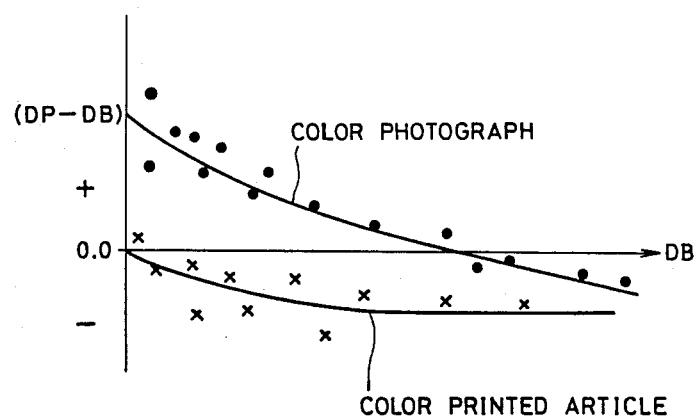
FIG. 4 is a graph showing distributions of density differences for color photographs and color printed articles.

Either by using slit measurement or by using area measurement, the color original can be classified based on statistically processed color densities. Specifically shown in FIG. 4 wherein X and Y axes represent blue color density DB and the difference of color densities (DP−DB), general color photographs and color printed articles exhibit density distributions shown by the respective curves. Therefore, color originals can be classified by plotting their color densities on these curves.

Figure 5:
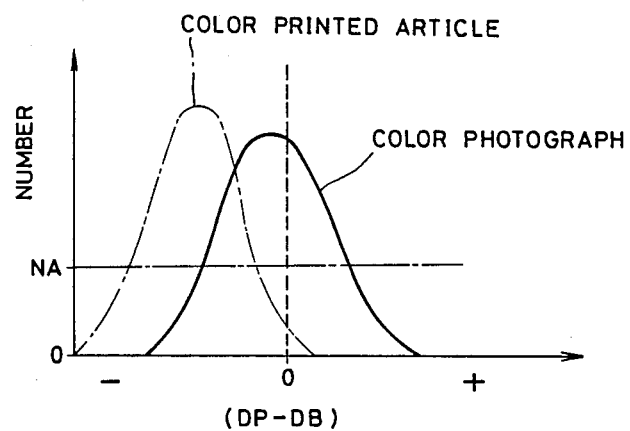
FIG. 5 is a histogram showing distributions of density differences for color photographs and color printed articles.

It may be convenient to utilize histogram such as shown in FIG. 5. In this case, each color original can be classified based on the measured peak values of the detected density differences and their number.

Although, in the above embodiment, color originals are classified based on a density difference (DP−DA), it is permissible to use the ratio of densities (DP/DA). In this case, color originals can be classified as color photographs when satisfying the following condition:

$$DP/DA \geqq B$$

In this condition, the threshold value B is set, for example, at 1.06. Color originals whose density ratio is smaller than the threshold value B are determined to be color printed articles.

Figure 6:
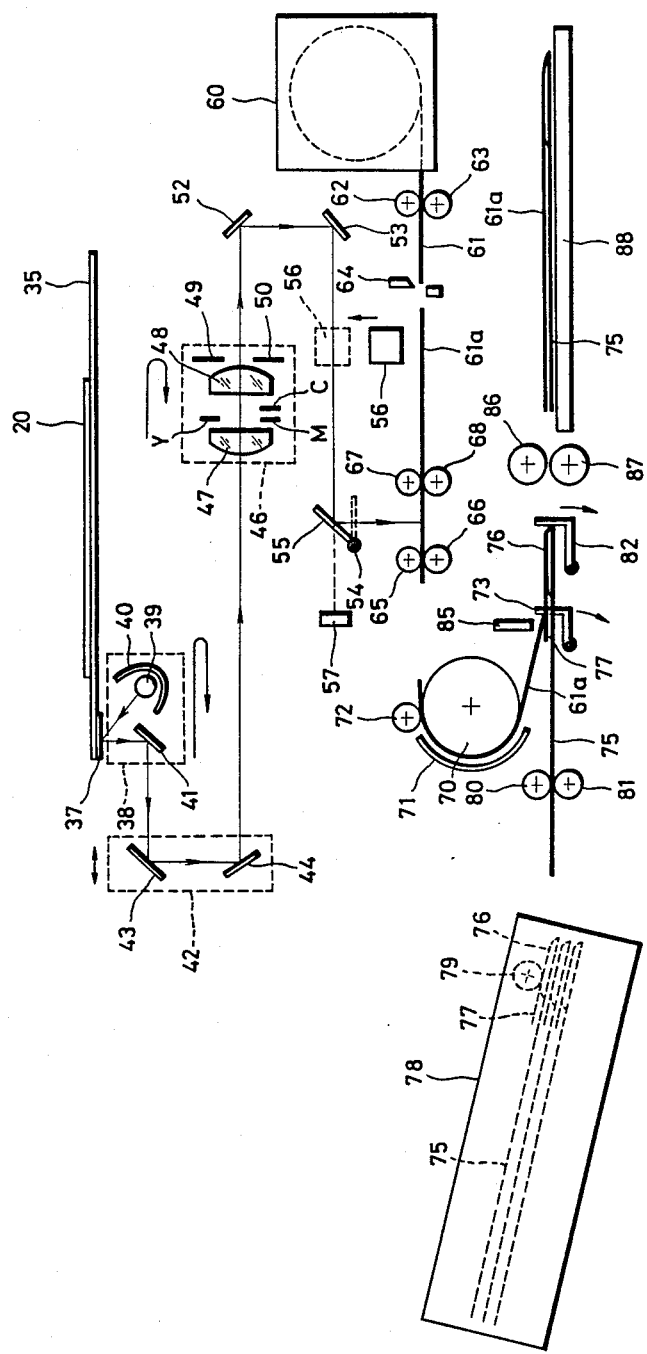
FIG. 6 is a fragmentary cross sectional illustration showing a color image reproducing machine embodying the present invention.

Reference is now had to FIG. 6, illustrating a silver salt diffusion transfer processing type copying machine to which the color original classifying method according to the present invention is applied. On a transparent table 35 a color original 20 is placed in position with its back surface covered by a light opaque cover (not shown). On the under surface of the table 35 there is provided a standardized reflection member 37 which reflects light which is detected to check the light intensity of an illumination lamp and the transmittances of the color filters which will be described later.

A light source unit 38 includes an illumination lamp 39, a reflector 40 and a reflection mirror 41 and is capable of reciprocally moving in parallel with the table 35 to scan lengthwise over the color original 20 on the table 35 with transverse line illumination. A mirror unit 42 supports therein a pair of reflection mirrors 43 and 44 disposed facing each other at 45° so as to reflect the light through 180°. This mirror unit 42 is maintained in a selected position but is moved when the copying ratio is changed.

A lens unit 46 has front and rear lens groups 47 and 49 (each group is depicted as a single-element lens group for simplicity), yellow Y, cyan C and magenta M color filters disposed between the front and rear lens groups, and oppositely movable aperture plates 49 and 50 disposed behind the rear lens group 48. This lens unit 46 is synchronized with the light source unit 38 to focus an image of the color original 20 on a photosensitive paper 61. Each filter Y, C, M is independently movable into and out of the optical path of the first and second lens groups 47 and 48 so as to regulate the amount of exposure light passed therethrough in order to control the components of the light and hence the color balance of the exposure light.

For directing the light from the color original 25 to the photosensitive paper, there are arranged fixed mirrors 52 and 53, and a swingable mirror 55. The swingable mirror 55 is pivoted at 45° and swings downwardly when the previously described pre-scanning operation is conducted so as to allow the reflected light from the color original 20 to reach light measuring unit 57.

Figure 7:
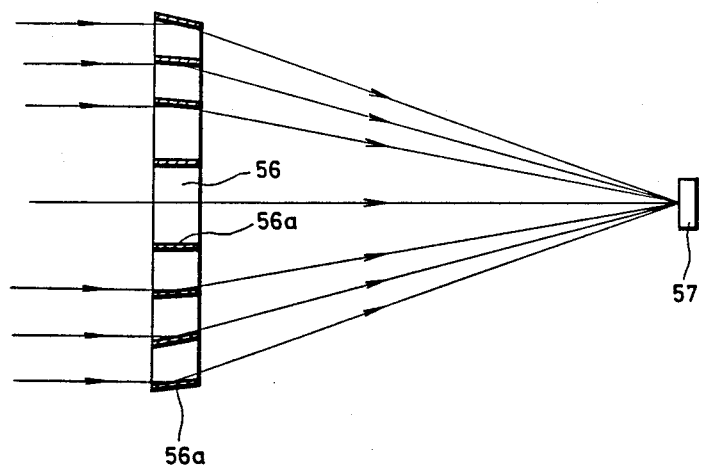
FIG. 7 is a cross sectional view of a light collecting device used in the color image reproducing machine of FIG. 6.

A light collecting mirror unit 56 is brought into the optical path as shown by a dotted line in FIG. 6 when pre-scanning is conducted. This light collecting mirror unit, as shown in detail in FIG. 7, comprises a plurality of reflection mirrors 56a arranged to reflect incident light toward the light measuring unit 57.

Figure 8A:
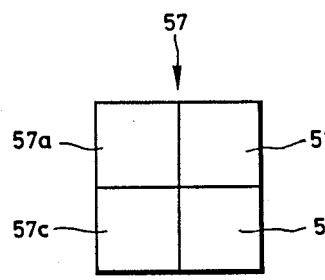
FIGS. 8A and 8B are fragmentary illustrations of a light measuring device used in the color image reproducing machine of FIG. 6.

As is shown in FIG. 8A, the light measuring unit 57 comprises sensors 57a, 57b, 57c for red, green and blue, respectively and a sensor 57d having a peak sensitivity at a wavelength between 370 and 420 nm. There is a paper magazine 60 containing a roll of photosensitive paper 61 which can be processed using a silver salt diffusion transfer process. The photosensitive paper 61 is withdrawn by means of a pair of rollers 62 and 63 disposed in front of the paper magazine 60 and is cut to a predetermined length of paper sheet 61a by means of a cutter 64. The paper sheet 61a is nipped at its forward end by a pair of rollers 65 and 66. Before the pair of rollers 65 and 66 is a pair of supporting rollers 67 and 68 which form an exposure space therebetween and just beneath the swingable mirror 55.

During reproduction of an image of the color original, the rollers 65 through 68 are driven in synchronism with the paper movement of the light source unit 46 to transport the paper sheet 61a toward a rotary drum 70. Disposed surrounding the rotary drum 70 are a guide member 71 and a guide roller 72. The paper sheet 61a, after having been exposed to the light reflected by the color original 20, is transported by the rotary drum 70 until being stopped at the forward end thereof by the first stopper 73.

An image receiving sheet holding cassette 78 is mounted on the reproducing machine. In the cassette 78 there is a stack of diffusion transfer processing type image receiving sheets 75, each of which is provided at its leading end with a rupturable pod containing a processing liquid therein and a funnel member 77 for leading the processing liquid from the pod 76. A feeding roller 79 is brought into contact with the uppermost image receiving sheet 75 upon mounting the cassette 78 on the reproducing machine and feeds it between a pair of nip rollers 80 and 81 during pre-scanning. Upon exposing the photosensitive paper sheet 61a, the nip rollers 80 and 81 are driven in a well known manner to transport the image receiving sheet 75 to second stopper 82 which stops the image receiving sheet 75 at its leading end and places it in position. It is to be noted that the nip rollers 80 and 81 nip side margins of the image receiving sheet 75 to avoid accidental release of the processing liquid in the pod 76. The photosensitive paper 61 and image receiving sheets 75 are the same in mechanical and chemical construction as those well known in the instant photographic art and now available on the market.

The exposed photosensitive paper sheet 61a is attached at its leading end to the image receiving sheet 75 with the aid of, for example, heat sealing means 85 and is then passed between a pair of pressure applying rollers 86 and 87 so as to rupture the pod in order to release the processing liquid between the two sheets 61a and 75. As the sheets 61a and 75 are passed between the pressure applying rollers 86 and 87 to be overlapped, the released processing liquid is distributed between the overlapping sheets 61a and 75 in a thin uniform layer. For short-time diffusion transfer processing, the overlapped sheets 61a and 75 as a unit are placed on a constant temperature plate 88 for a short while. By separating the image receiving sheet 75 from the photosensitive paper sheet 61a, a finally developed image is provided on the image receiving sheet 75.

The operation of reproducing an image using the method according to the present invention through the use of the copy machine described above will be hereinafter described in greater detail. When a copy start key (not shown) is operated to start a sequential operation, pre-scanning is started to detect the densities of the color original simultaneously with the necessary transportation of the photosensitive paper 60 and the image receiving sheet 75. In more detail, upon operation the copy start key, the rollers 79 to 81 start their rotation, so as to withdraw the foremost image receiving sheet 75 until the image receiving sheet 75 is stopped at its leading end by the second stopper 82. On the other hand, the rollers 62 and 63 simultaneously start their rotation, so as to withdraw the photosensitive paper 61 to a predetermined length. Upon this predetermined length transportation of the photosensitive paper 61, the rollers 67 and 68 nip the leading end of the photosensitive paper 61 and, simultaneously, the cutter 64 cuts it to the predetermined length to provide the photosensitive paper sheet 61a. The photosensitive paper sheet 61a is further transported until the leading end thereof is nipped by the rollers 65 and 66. When the photosensitive paper sheet 61a is placed in position, all the rollers 65 through 68 stop.

Prior to pre-scanning, the filters Y, M and C, and the first and second aperture plates 49 and 50 are placed in their standard positions. Upon the operation of the copy start key, the swingable mirror 55 and the light collecting mirror unit 56 are changed in position as shown by dotted lines in FIG. 11, respectively. Thereafter, the light source unit 38 and the lens unit 46 are simultaneously moved to scan lengthwise over the color original 20 with transverse line illumination. At the beginning of pre-scanning, the light from the illumination lamp 39 is reflected by the standardized reflection member 37 and directed to the light collecting mirror unit 56 by the mirrors 41 to 44 of the mirror unit 42, the lens unit 46, and the fixed mirrors 52 and 53. As is shown in detail in FIG. 7, the light collecting mirror unit 56 directs the light beams from the standardized reflection member 37 toward the light measuring unit 57. Following this, the light source unit 38 continuously scans lengthwise over the color original 20 with transverse line illumination at a constant speed so as to detect the reflected light from the respective divisions into which the color original 20 is spatially divided. The light collected by the light collecting mirror unit 56 is received by the light measuring unit 57 which provides density signals. Thereafter, the light source unit 38 and the lens unit 46, as well as the swingable mirror 55 and the light collecting mirror unit 56, return to their initial positions, shown in FIG. 6 so as to finish the pre-scanning operation on the color original 20.

When the standardized reflection member 37 is scanned with transverse line illumination, the sensors 57a to 57d detect four different reflection densities of the standardized reflection member 37 for each division. The reflection densities are added together by color to calculate mean reflection densities for the respective colors. Since the reflection densities of the standardized reflection member 37 itself are previously known, changes in characteristics of the illumination lamp 39 and the filters Y, M and C can be detected by comparing the detected and known reflection densities.

In the same way, the color original 20 is scanned lengthwise with the transverse line illumination to detect four reflection densities for each division. Based on these detected reflection densities, the color original 20 is examined and classified by a procedure shown by a chart in FIG. 9. For examination, the three color reflection densities DR, DG and DB are retrieved, by divisions, and added together to calculate an arithmetical mean value thereof. The color original 20 is then classified to be a color printed article if having no division which has a mean value smaller than 0.8.

When the color original 20 has at least one division which has a mean value not smaller than 0.8, then the density difference Xi is calculated using the following equation:

$$Xi = Pi - (DRi + DGi + DBi)/3$$

As a result of this calculation, the color original 20 is classified to be a color printed article if the density difference Xi is smaller than 0.05 or to be a color photograph if otherwise.

If in fact the color original 20 is classified to be a color photograph, the copying machine reads out data on the amount of insertion of the filters Y, M and C into the optical path suitable for color photographs from the ROM 30 so as to adjust the filters in order to provide well balanced color components. On the other hand, if the color original is determined to be a color printed article, the machine reads out data on the amount of insertion of the filters Y, M and C into the optical path suitable for color printed articles, based on which the filters are controllably inserted into the optical path.

Following the discrimination of the color original, the six reflection densities are added together by color to obtain arithmetical mean densities for blue, green and red. For better color balance, corrected exposures are calculated for blue, green and red by using exposure calculating formulas as used in conventional color printers. Considering all possible factors such as the corrected exposures, compensating exposures depending on changes of the illumination lamp and filters; the characteristics of the photosensitive materials, for example the type of the photosensitive material; and the circumferential printing temperature, the amount of insertion of each filter Y, M, C into the light path is finally determined. If a correct exposure is insufficiently effected by the filters Y, M and C, the aperture plates 49 and 50 are used for additional correction.

After the adjustment of the filters Y, M and C, the illumination light unit 38 is again moved to scan the color original 20 with the transverse line illumination. In synchronism with the movement of the illumination light unit 38, the rollers 65 to 68 rotate to continuously transport and expose the photosensitive paper sheet 61a. Thereby, latent image of the color original 20 is formed in the photosensitive paper sheet 61a. The photosensitive paper sheet 61a with the latent image is then transported by the rotary drum 70 and placed in position by the first stopper 73. At the time the photosensitive sheet 61a is stopped by the first stopper 73, the rotary drum 70 stops to maintain the rear end of the photosensitive sheet 61a between the roller 72 and the rotary drum 70. When the rotary drum 70 stops, the first stopper 73 is removed from the path of the photosensitive paper sheet 61a.

The rollers 80 and 81 are actuated to rotate so as to transport the image receiving sheet 75 under the photosensitive paper sheet 61a. When the leading end of the image receiving sheet 75 is stopped by the second stopper 82, the rollers 80 and 81 are stopped to place the image receiving sheet 75 in position, where the funnel member 77 is overlapped with the leading end of the photosensitive paper sheet 61a. The heat sealing device 85 moves downwardly to weld the leading end of the photosensitive paper sheet 61a to the funnel member 77. Due to this welding, the photosensitive paper sheet 61a is maintained in correct registry with the image receiving sheet 75 during processing so as to prevent the reproduced image from being blurred or changed in position. For easy welding, a hot melting adhesive agent is previously applied to the upper surface of the funnel member 77.

After the second stopper 82 has been removed from the path of the image receiving sheet 75, the rollers 80 and 81 are actuated again to rotate, forwarding the overlapped sheets 61a and 75. During the forwarding of the overlapped sheets, the roller 72 rotates following the movement of the photosensitive paper sheet 61a. Since the pressure applying the rollers 86 and 87 are synchronized with the rollers 80 and 81, the pressure applying roller 86 and 87 nip and transport the overlapped sheets 61a and 75 therebetween while applying pressure. When the leading end of the image receiving sheet 75 passes between the pressure applying rollers 86 and 87, the pod 76 is ruptured to release the processing liquid between the overlapped sheets 61a and 75. During the progress of the transportation of the overlapped sheets, the processing liquid is distributed as uniform layer. The overlapped sheets 61a and 75 are then left on the constant temperature plate 88 and maintained at a predetermined proper temperature, for example 25° C., for a predetermined time. After the predetermined time, the image receiving sheet 75 is separated from the photosensitive paper sheet 61a to provide a color positive image reproduced by a well known diffusion transfer process.

Figure 10:
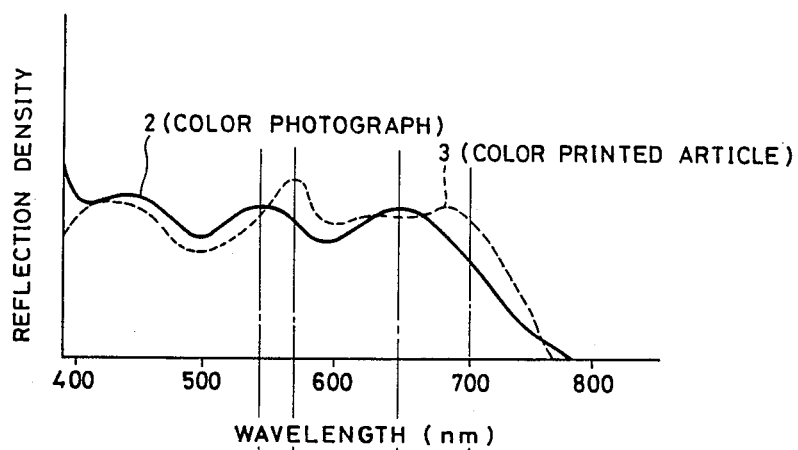
FIG. 10 is a graph similar to FIG. 1 showing reflection density distributions of color photographs and color printed articles.

When color originals have images with relatively high or high density and with standard color distributions, it is preferred to classify them into color photographs and color printed articles by using plural light sensors having peak sensitivities at different wavelengths within the wavelength band of any one of the three primary colors, namely blue, green or red. As is shown in FIG. 10, color originals generally have a spectral reflection density distribution shown by a solid line 102 for color photographs and by a dotted line 103 for color printed articles. The spectral distribution of the color printed articles has a peak at wavelengths of green.

The color photographs include magenta dye having a peak reflection density at a wavelength between 530 and 560 nm and cyan dye having a peak reflection density at a wavelength of approximately 650 nm. These dyes show a rapid decrease of reflection density on both sides of the maximum reflection density.

On the other hand, a magenta ink used in color printing has a peak of reflection density at a wavelength of approximately 570 nm. Cyan ink has a spectral reflection density distribution which is flat between the wavelengths of 600 to 700 nm and which decrease more rapidly than that of the cyan dye used in color photography for wavelengths longer than 700 nm.

To detect reflection densities of color originals, two sets of sensors are used to detect reflection densities for green and red; each comprising first and second light sensors. The first and second light sensors for green have spectral sensitivities having peaks at wavelengths of 540±15 nm and 570±15 nm, as shown by curves g1 and g2 in FIG. 11, respectively. The first and second light sensors for red have spectral sensitivities having peaks at wavelengths of 630±40 nm and 680±40 nm as is shown by curves r1 and r2 in FIG. 11, respectively. If the first light sensor for red has its peak sensitivity at a wavelength of 650±20 nm or at a wavelength of 610±20 nm, the second is desired to have its peak sensitivity at a wavelength of 700±20 nm or at a wavelength of 660±20 nm.

The light sensors for green are used to classify color originals based only on green reflection densities and, on the other hand, the light sensors for red are used to classify color originals based only on red reflection densities. However, color originals often reflect less of one of the red or green components of light. Therefore, it is preferred to use both the sensors for green and red, to thereby detect both green and red reflection densities.

Figure 12:
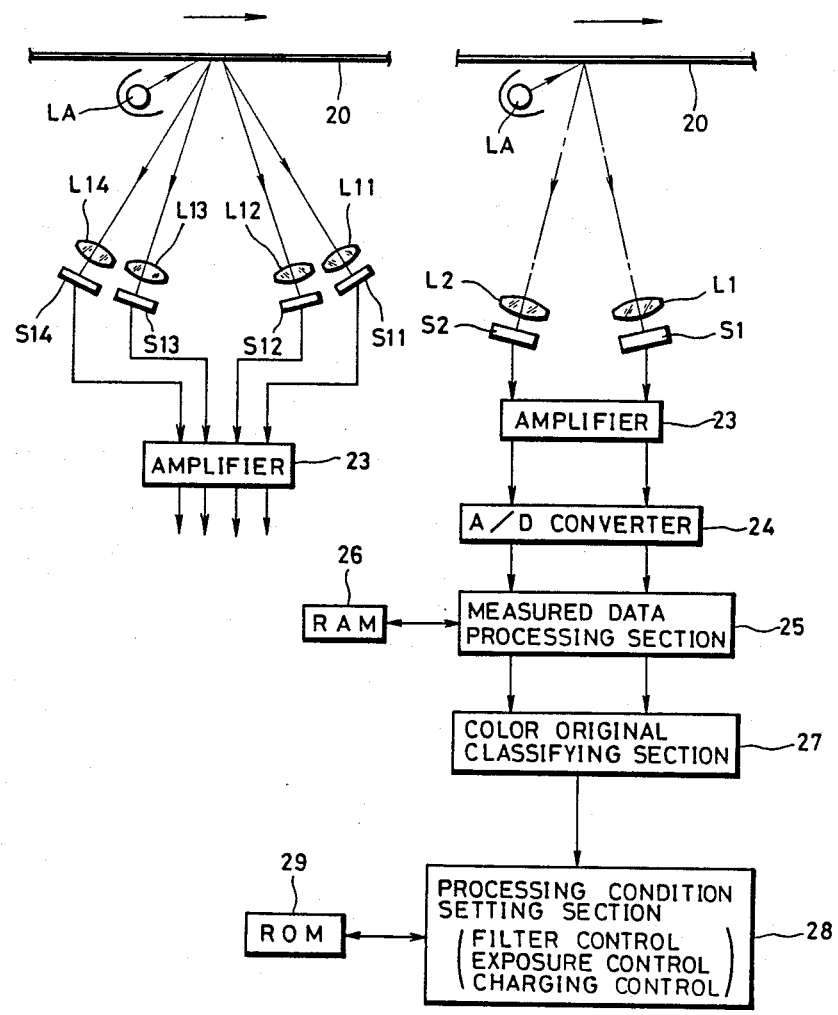
FIG. 12 is a block diagram of a second preferred embodiment of the present invention.

For classification of color originals based on the green and red reflection densities, the classifying apparatus of another preferred embodiment according to the present invention shown in FIG. 12 is used. In this embodiment, the first and second sensors 21 and 22 of the classifying apparatus of FIG. 2 are replaced by first and second light sensors S1 and S2 having lenses L1 and L2. Each light sensor S1, S2 receives reflected light from the color original 20 to provide signals which are dealt with in the same manner as described in the previous embodiment.

Figure 13:
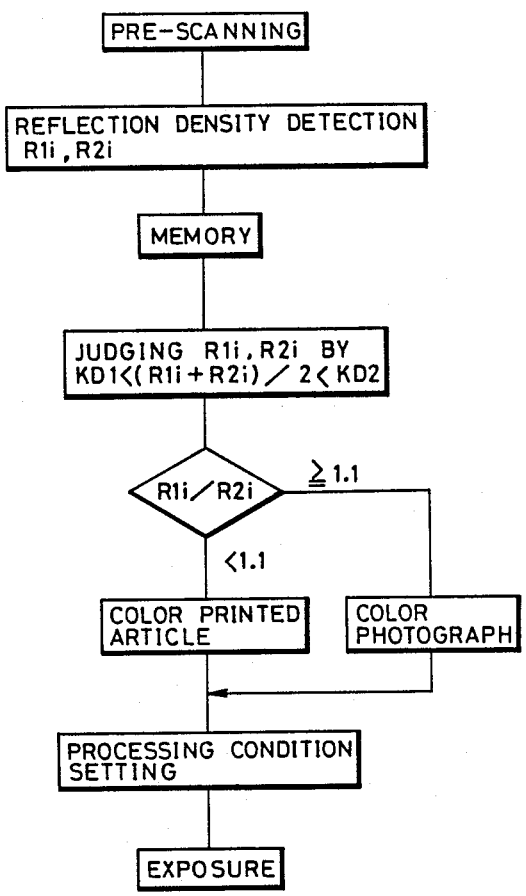
FIG. 13 is a flow chart similar to FIG. 9 showing an example of the classification of color originals in the apparatus of FIG. 12.

The color original 20 is classified, for example, based on red reflection densities, by a sequential process shown by the chart in FIG. 13. In this case, the first and second light sensors S1 and S2 for red having sensitivity peaks at wavelengths of 630±40 nm and 680±40 nm, respectively. The first and second light sensors detect reflection densities R1i and R2i for each division. The detected reflection densities R1i and R2i are stored in the memory. After pre-scanning, the reflection densities R1i and R2i are retrieved division by division to be examined using the following condition:

$$KD1 < (R1i + R2i)/2 < KD2$$

wherein KD1 and KD2 are coefficients; for example "0.3" and "1.5", respectively.

If there is a division which satisfies the above condition, then the ratio of the reflection densities (R1i/R2i) is calculated as to that division. The color original 20 is classified to be a color photograph when the ratio is not smaller than 1.1 and to be a color printed article when less than 1.1. According to this classification, proper processing conditions are set in the image reproducing apparatus.

Instead of using the ratio of red reflection densities (R1i/R2i), the difference between the reflection densities (R1i−R2i) may be used. In this case, the color original is classified to be a color photograph when the difference is not smaller than 0.1 and to be a color printed article when less than 0.1.

Figure 11:
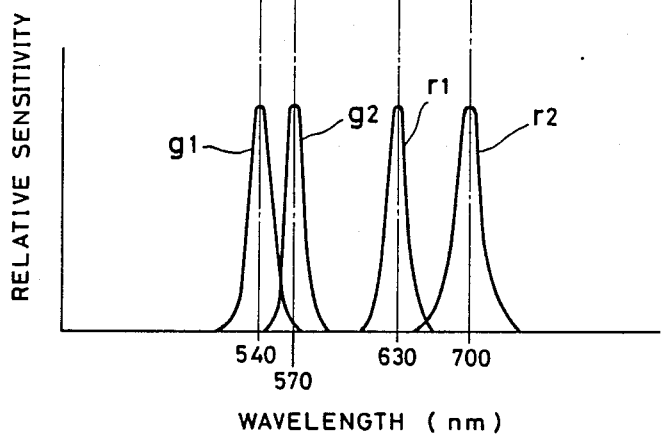
FIG. 11 is a graph showing the relative sensitivity of light sensors for green and red.

When using green reflection densities for classifying the color originals, the first and second light sensors for green having the spectral sensitivities shown by the curves g1 and g2 in FIG. 11 are used to detect green reflection densities G1i and G2i for each division.

The color original 20 is classified to be a color photograph when the ratio of reflection densities (G1i/G2i) is not smaller than 1.0 and to be a color printed article when less than 1.0. The color original 20 may be classified to be a color photograph when the difference between the reflection densities (G1i−G2i) is not smaller than 0.0 or to be a color printed article when less than 0.0.

Alternatively, in any case, it may be desirable to detect an average reflection density over the whole area of the color original or to detect densities at a large number of points of the color original.

Figure 14:
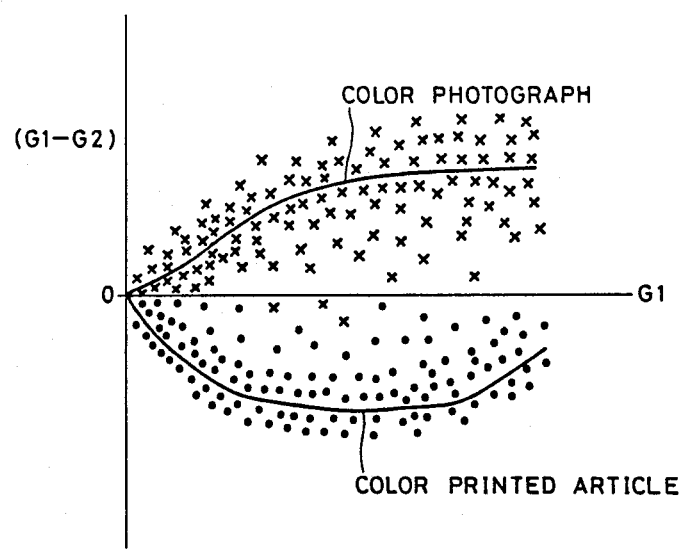
FIG. 14 is a graph similar to FIG. 4 showing distributions of density differences for color photographs and color printed articles.

It may be convenient to classify color originals by statistically processing the reflection densities. As is shown in FIG. 14, wherein X and Y axes represent the green density (G1) and the difference between green densities (G1−G2), respectively, the color originals, namely color photographs and color printed articles, show different reflection density distribution curves, respectively. By plotting densities of the color original on the distribution curves, the original can be easily classified into a color photograph or a color printed article.

Figure 15:
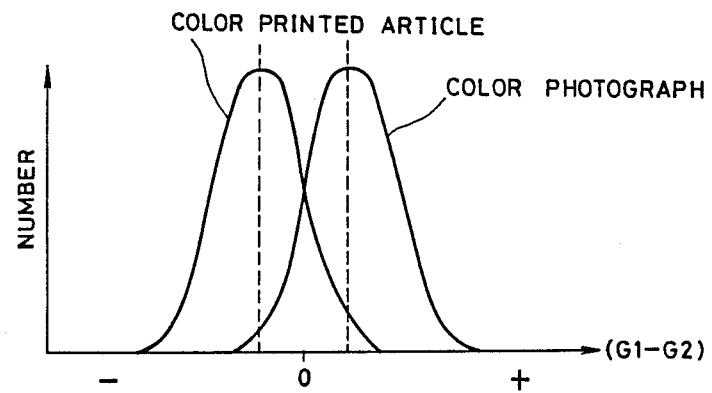
FIG. 15 is a histogram similar to FIG. 5 showing distributions of density differences of color photographs and color printed articles.

Otherwise, color originals can be classified using a histogram such as shown in FIG. 15. In this case, the color original 20 is measured to detect the number of divisions having predetermined reflection density differences (G1−G2).

FIG. 16 shows a classifying apparatus in which four reflection densities for red and green are used. For detecting these four reflection densities, there are four light sensors S11–S14 which associated lenses L11–L14, one for each light sensor. Outputs from the light sensors are processed in the same way as described in the previous embodiments to provide four reflection densities R1i, R2i, G1i and G2i for each division.

Classification is sequentially effected as shown by the chart in FIG. 17. At first, reflection densities for green are retrieved, by division, for examination using the following condition:

$$G1i - G2i < -0.10$$

The color original 20 is classified as a color printed article when it has more than a predetermined number K of divisions which have green reflection densities satisfying this condition. The number K is fixed as a coefficient and, for example in this embodiment, is equal to 20% of the total number of the divisions into which the color original is divided.

If the color original has less than K divisions, each of which have green reflection densities satisfying the above condition, the color original 20 is further examined using the following condition:

$$G1i - G2i > 0.1$$

The color original 20 is classified as a color photograph when it has more than K divisions having green reflection densities satisfying this condition. If not, the color original is further examined using the following condition:

$$R1 > 0.4$$

The color original, if not satisfying this condition is classified as having a middle density, for example an image including white margins such as images including letters, illustrations, art graphics, handwriting and the like. For color originals having middle densities, the processing conditions may be the same as for color printed articles.

The color original 20 is then examined using the following condition:

$$R1i - R2i > 0.1$$

The color original is classified as a color photograph when it has more than K divisions satisfying this condition. Otherwise, the color original is classified as a color printed article. This condition is particularly advantageous when using light sensors S11, S12 for red having spectral sensitivities with peaks at wavelengths of $650 \pm 20$ nm (defined by the sensitivity distribution curve r1) and at $700 \pm 20$ nm (defined by the sensitivity distribution curve r2).

However, if the first light sensor 129 has a sensitivity with a peak at a wavelength of $610 \pm 20$ nm and the second light sensor 130 has a sensitivity with a peak at a wavelength of $660 \pm 20$ nm, the following condition may be advantageously used:

$$R1i - R2i < 0.0$$

When the color original 20 satisfies this condition, it is classified as a color photograph and, when not, as a color printed article. This classification is effected in the same image reproducing machine as shown in FIG. 6 and according to the result of this classification, proper processing conditions are set in the image reproducing machine.

Figure 18:
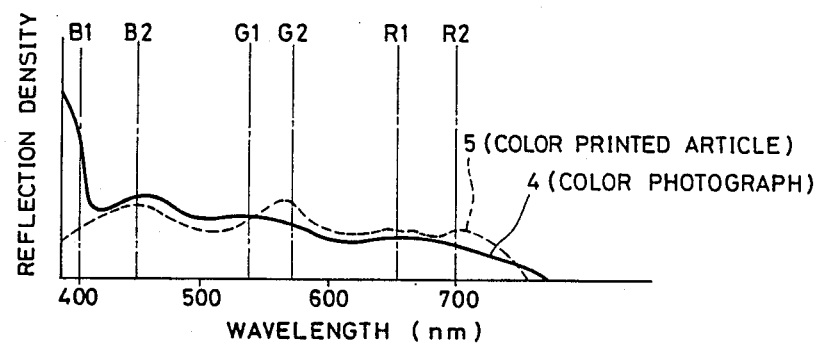
FIGS. 18 and 19 are graphs similar to FIG. 1 showing distributions of reflection densities for color photographs and color printed articles.
Figure 19:
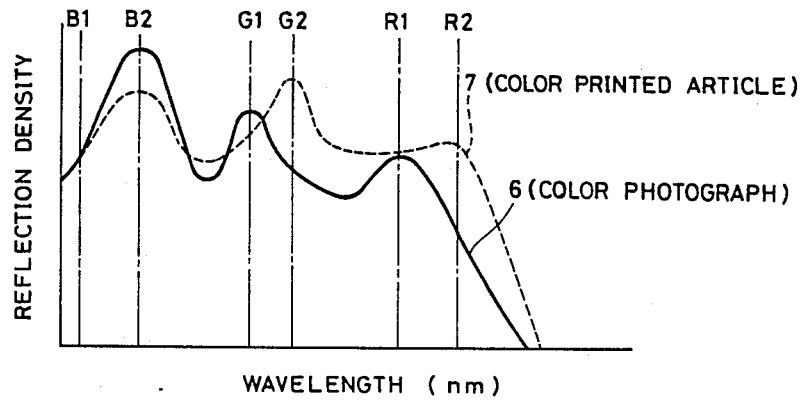

For more accurate classification of color originals, another embodiment can be provided. Referring now to FIGS. 18 and 19, shown therein are spectral reflection density distribution curves. The curves 4 and 5 are the spectral reflection density distributions of color photographs and color printed articles, respectively, each having an image with a standard color distribution and a low reflection density. The curves 6 and 7 show the spectral reflection density distributions of color photographs and color printed articles, respectively, each having an image with a standard color distribution and a relatively high or high reflection density.

As is apparent from FIGS. 18 and 19, the color photograph having an image with low reflection density exhibits a large density difference between about 400 and 470 nm. This large density difference results from the fact that color photographic materials such as color films or color papers include media which have a maximum reflection density or absorption maximum for light having wavelengths at about 380 nm. On the other hand, the reflection density of the color photograph having an image with a relatively high or high reflection density is higher at 450 nm than at 400 nm.

As is well known in the art, color photographs generally include a magenta dye having a maximum reflection density or absorption maximum for light having wavelengths between 530 and 560 nm, and a cyan dye having a maximum reflection density or absorption maximum for light having wavelengths of about 650 nm. These dyes have a tendency to considerably decrease in reflection density or absorption on both sides of the wavelength at which the dyes show the maximum reflection density or absorption maximum. On the other hand, magenta inks used in color printing have a maximum density for light having wavelengths of about 570 nm. Cyan inks used in printing have a reflection density distribution which is flat between about 600 and 700 nm and exhibit a sharper density drop for light having wavelengths longer than 700 nm in comparison with the cyan dye used in color photographic materials.

Figure 20:
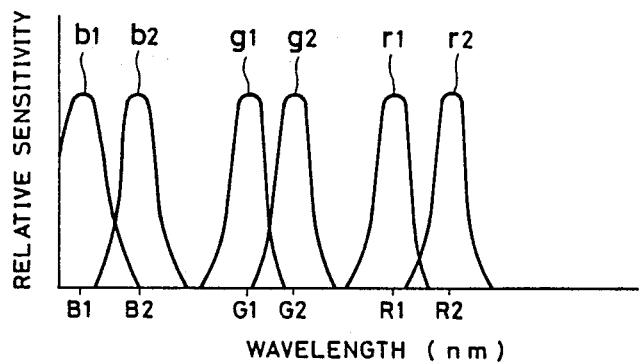
FIG. 20 is a graph showing a relative sensitivities of light sensors for blue, green and red.

As is apparent from the above, the spectral density distribution is different between color originals, namely color photographs and color printed articles. Based on this fact, by detecting reflection densities of color originals using reflection light sensing means having different the light sensitivities shown in FIG. 20, the color originals can be determined to be color photographs or color printed articles. FIG. 20 shows sensitivity curves b1, b2, g1, g2, b1 and b2 of first to sixth light sensors for blue, green and red. The first and second light sensors sensitive to blue light have sensitivity curves b1 and b2 with peak sensitivities at a wavelength of B1 (for example $400 \pm 30$ nm) and a wavelength of B2 (for example $450 \pm 30$ nm), respectively. The third and fourth light sensors sensitive to green light have sensitivity curves g1 and g2 with peak sensitivity at wavelengths of G1 (for example $540 \pm 15$ nm) and at G2 (for example $570 \pm 15$ nm), respectively. The fifth and sixth light sensors sensitive to red light have sensitivity curves r1 and r2 with peak sensitivity at wavelengths R1 (for example $630 \pm 40$ nm) and R2 (for example $680 \pm 40$ nm), respectively.

Figure 21:
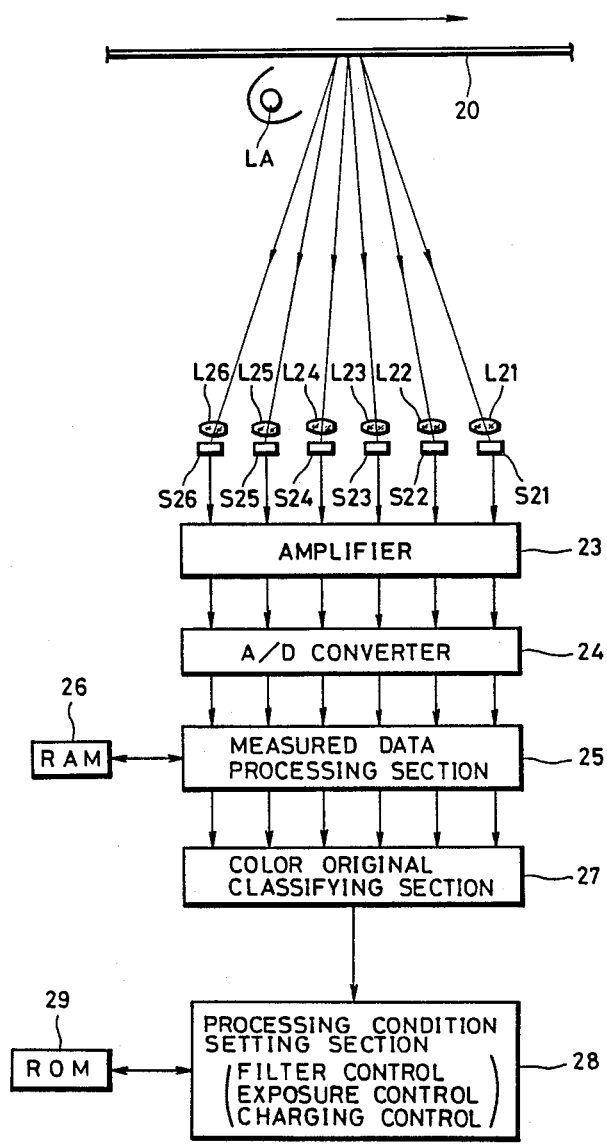
FIG. 21 is a block diagram showing a fourth embodiment of the present invention.

Reference is now had to FIG. 21 which shows the essential structure of another preferred embodiment of the present invention. Prior to reproducing a color image on paper, a color original is scanned to detect the light intensity reflected therefrom. For this pre-scanning, the color original 20 is transported in the direction shown by the arrow and illuminated by a lamp LA. The reflected light from the color original 20 is received by the first to sixth light sensors S21 to S26 through lenses L21 to L26 disposed for each sensor. The first and second light sensors S21 and S22, which have a sensitivity characteristic represented by the sensitivity curves b1 and b2 shown in FIG. 20, respectively, receive the reflected light to detect blue densities DB1i and DB2i, respectively. The third and fourth light sensors S23 and S24, which have sensitivity characteristics represented by the sensitivity curves g1 and g2 shown in FIG. 20, respectively, receive the reflected light to detect green densities DG1i and DG2i, respectively. The fifth and sixth light sensors S25 and S26, which have sensitivity characteristics represented by the sensitivity curves r1 and r2 shown in FIG. 20, respectively, receive the reflected light to detect red densities DR1i and DR2i, respectively.

Each of these light sensors S21 to S26 is a photoelectric element well known per se in the art and provides an electrical output corresponding to the received light intensity. This output from each light sensor S21 through S26 is converted into a digital signal by A/D converter 24 after amplification by an amplifier 23, so as to provide a color density signal. Six color density signals, two for each color, are sent to a RAM 26 through a measured data processing section 25. After pre-scanning, the measured data processing section 25 reads out the six color density signals from the RAM 26 to compare the two density signals by color; the results from the comparison are transferred to a color original classifying section 27 to determine whether the color original is a color photograph or a color printed article.

The result of the determination is sent to a processing condition setting section 28 to set forth processing conditions with reference to preselected processing conditions stored in ROM 29. Processing conditions are set according to the type of color original so as to reproduce an image with high image quality and good color balance and color density, and are different according to the reproducing apparatus. Generally, an image with high quality can be reproduced by controlling reproducing conditions such as the color components of reproducing light, exposures, charging, developing bias or the like. In addition to the above, the processing conditions include selection of materials with desirable gradation, image forming dyes and/or the size at which an image is reproduced; selection and control over developing conditions such as the developing process and processing time; selection and control over desirable illumination sources, control over gradations by secondary exposure; and control over the reproductivity of color tone, and the sharpness of the scanned image.

Figure 22:
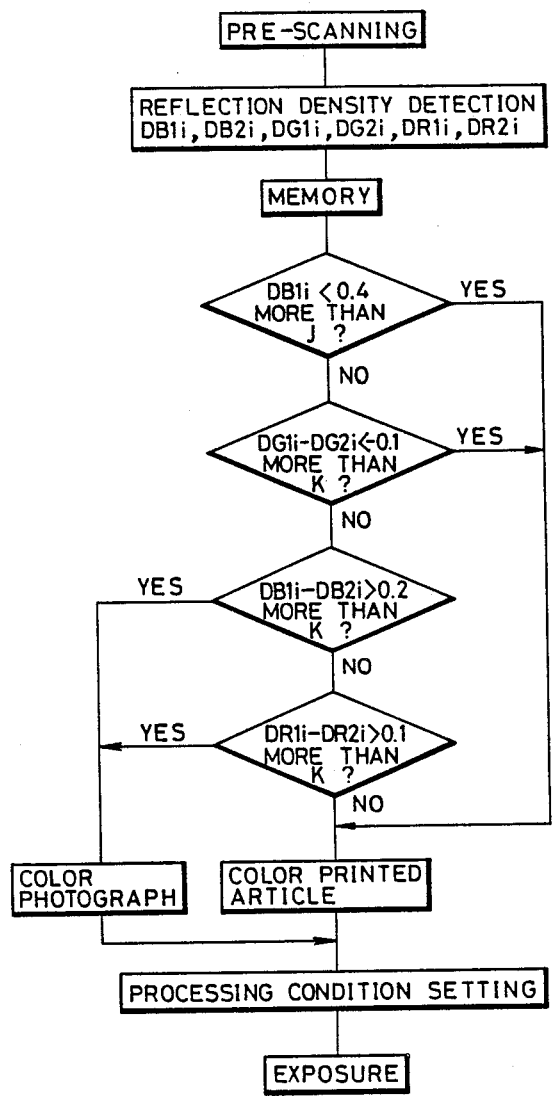
FIG. 22 is a flow chart showing the process of classifying color originals in the apparatus of FIG. 21.

One example of the color original determination according to the invention will now be described with reference to FIG. 22. By pre-scanning slitted areas of the color original 20, color densities $DB1i$ and $DB2i$ for blue, $DG1i$ and $DG2i$ for green, and $DR1i$ and $DR2i$ for red are detected and memorized. After pre-scanning, color densities $DB1i$ are read out for the respective slitted areas in order and judged by the following condition:

$$DB1i < 0.4$$

The color original, if including J or more slitted areas having blue densities satisfying the above condition is determined to be a color printed article. The number J be one (1). This determination is based on the fact that the blue color density of a color image with low density is different between a color photograph and a color printed article.

If the color original includes no slitted area or divisions satisfying the above condition, then the blue densities of the respective slitted areas are judged by the following conditions:

$$DG1i - DG2i < -0.1$$

The color original, if including K or more areas having green densities satisfying this condition is determined to be a color printed article. This determination is based on the color characteristics of color printed articles with high densities.

If in fact the color original has less than K slitted areas having densities satisfying the above condition, the following condition is used to determine the color original:

$$DB1i - DB2i > 0.2$$

As a result of the judgement of each slitted area, if the color original has K or more slitted areas having densities satisfying this condition, it is determined to be a color photograph. This determination is based on the color characteristics of color photographs with low densities.

If the color original has less than K slitted areas having densities satisfying the latter condition, then the color original is judged by the following condition:

$$DR1i - DR2i > 0.1$$

This determination is based on the fact that the red density of an image with a relatively high or high density is different between a color photograph and a color printed article. The color original, if in fact including K or more slitted areas having red densities satisfying the latter condition, is determined to be a color photograph and, on the other hand, if not, to be a color printed article. The numbers J and K are obtained empirically.

The red density condition above is advantageously used when the sensitivity curves r1 and r2 have a maximum at $650 \pm 20$ nm and $700 \pm 20$ nm, respectively. When the sensitivity curves r1 and r2 have a maximum at $610 \pm 20$ nm and $660 \pm 20$ nm, respectively, the following condition should be applied:

$$DR1i - DR2i < 0.0$$

This condition is formed based on the fact that the overlap portion between spectral characteristics is larger for the magenta and cyan inks used in color printing than the corresponding parameter in color photographs.

Because yellow, magenta and cyan dyes have the property of unwanted absorption, color originals with an imbalance in these three colors is susceptible to unwanted absorption by the dyes. Therefore, it is preferable to select one of the preceding 5 conditions in accordance with the density difference between, or the ratio of, at least two of blue, green and red color densities. For example, an image of a clear sky mainly consisting of cyan dye has unwanted absorption at around 400 nm. Due to the unwanted absorption, the color original may be judged based on the first red density difference condition in place of the blue density difference condition for accurate color original determination if the color original has color densities satisfying either one of the following conditions:

$$DR1i - DB2i > 0.5, \text{ or}$$

$$DR1i - (DG1i + DB2i)/2 > 0.5$$

In the above described color original classification scheme, the ratio of densities of each color may be replaced with the density difference in order to compare two color densities. For example, the color original, if having slitted areas having a red color density ratio ($R1i/R2i$) larger than 1.1 more than K times, is determined to be a color photograph and, if having less than K such instances, to be a color printed articles. Otherwise, color originals can be statistically determined by using a histogram wherein X and Y axes represent the density difference between the two green densities ($DG1 - DG2$) and the number of slitted areas, respectively. Since, peaks are different according to the color original, color originals can be easily judged and classified based on their peaks.

Alternatively, color originals can be more easily judged and classified. A maximum density DB2 is extracted among the densities DB2i. The maximum density DB2 is judged using the following condition;

$$DB2 < 0.5$$

If this condition is satisfied, a maximum density DB1 is extracted among the densities DB1i and judged using the following condition:

$$DB1 - DB2 > 0.0$$

If the maximum densities DB1 and DB2 satisfy this condition, the color original 20 is determined to be a color photograph. On the other hand, if the condition is not satisfied, the color original is determined to be a color printed article. The latter condition is based on the characteristics of color photographs having low reflection density.

Those color originals having relatively high or high reflection density which do not satisfy the first condition are judged using the following condition:

$$DR1 - DR2 > 0.1$$

This condition is based on the characteristics of color photographs having relatively high or high reflection density. If the color original 20 satisfies this latter condition, it is determined to be a color photograph, and if not, to be a color printed article. It is to be noted that these densities DR1 and DR2 are the maximum densities among the densities DR1i and DR2i, respectively.

Otherwise, color original may be judged by using the following conditions:

$$DB1 < 0.5 \quad (1)$$

$$DR1 - DR2 > 0.0 \quad (2)$$

$$DG1 - DG2 > 0.0 \quad (3)$$

The color original is determined to be a color printed article when satisfying condition (1). If color originals which do not satisfy the condition (1) satisfy either one of the conditions (2) or (3), they are determined to be color photographs and the remaining color originals are determined to be color printed articles.

In any embodiment of the method of classifying color originals according to the present invention, detected light intensities may be used to examine and classify the color originals without being logarithmically transformed into reflection densities.

FIG. 23 shows an electrostatic color image reproducing machine embodying the color original classifying apparatus according to the present invention. A color original 101 is placed around a rotary drum 100 adapted to make three continuous rotations for every image reproduction and is scanned lengthwise with transverse line illumination by means of an illumination lamp 102. The illuminated light is reflected by the surface of the color original 101 to travel toward a swingable mirror 105 disposed in the optical path at 45° after passing through a slitting plate 103 and a lens unit 104.

Figure 8B:
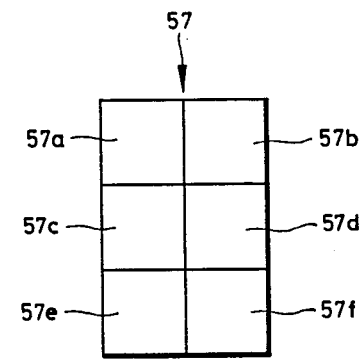

During pre-scanning, the swingable mirror 105 is placed in the optical path to reflect the incident light thereto at 45° and direct it to a light measurement unit 106 similar to that of the previously described color image reproducing machine shown in FIG. 6. The light measurement unit 106 includes six light sensors arranged as shown in FIG. 8B to detect six reflection densities for each division. As was previously described, based on the six reflection densities, the color original 101 is examined and classified and, according to the classified color original, exposures are controlled for the respective colors.

After pre-scanning, the swingable mirror 105 is turned up to a position shown by the dotted line in FIG. 23 to allow the light from the color original 101 to travel forwardly. A filter assembly having red, green and blue filters R, G and B, and a light shielding plate 107 is synchronized with the rotary drum 100 to insert one of the three color filters R, G and B in the optical path for every revolution in order to make a three color sequential exposure. Specifically, on exposing a cyan image, the red filter R is placed in the optical path in place of the light shielding plate 107 during one full revolution of the rotary drum 100. According to the correction exposure obtained based on the red reflection density of the color original 101, a voltage is controllably impressed on a charging device 110.

During rotation of a photosensitive drum 111 synchronized with the rotary drum 100, the outer surface of the photosensitive drum 111 is charged with electricity according to the exposure for red in consideration of the correction exposure. The light passing through the red filter R, after being reflected by a mirror 112, reaches the outer surface of photosensitive drum 111 to expose it. As a result of this exposure, exposed parts of the surface of the photosensitive drum 111 are discharged, but non-exposed parts are maintained electrically charged to form an electrostatic image of the color original on the outer surface of the photosensitive drum 111. This electrostatic image is then developed by a cyan developing device 113 to form a cyan toner image.

Simultaneously with the rotation of the photosensitive drum 11, a feeding roller 115 rotates to withdraw and feed an image recording sheet 116 to a rotatable drum 114. The rotatable drum 116 conveys the recording sheet 116 so as to charge it with electricity by means of a charging device 117. As a result, the cyan toner image formed on the outer surface of the photosensitive drum 111 is transferred onto the charged recording sheet 116. Then the rotatable drum 114 continues to rotate so as to convey the recording sheet 116 toward the charging device 117. Shown at 119 is a cleaner for removing toner left on the outer surface of the photosensitive drum 111.

After the cyan toner image transfer, the red filter R is replaced with the green filter G. In the same manner as for the red color image, a magenta toner image is formed on the photosensitive drum 111. The magenta image is transferred onto the same recording sheet 116 being continuously conveyed by the rotatable drum 114 and superposed on the cyan toner image previously transferred. In the same manner, the green filter G is replaced with the blue filter B, and a yellow toner image is transferred and superposed on the previously superposed cyan and magenta toner images on the same recording sheet 116. Thus, a color reproduced image is provided on the recording sheet 116.

During these three toner image formation steps, the charging device 110 is supplied with a votage which is higher when a color image is reproduced from a color photograph than when from color printed articles or color originals having medium density.

After the rotatable drums 100 and 114, and the photosensitive drum 111 have made three synchronized revolutions to form the cyan, magenta and yellow toner images superposed on the recording sheet 116, a pick-up arm 118 is operated to separate the recording sheet 116 from the rotatable drum 114 and transfer it onto a belt conveyor 122. Thereby, the recording sheet 116 passes between a pair of pressure and heat applying rollers 123 so as to make the toner stick firmly to the recording sheet 116, to thereby fix the color toner image. Finally, the recording sheet 116 with the color toner image formed thereon is placed in a tray 124.

There are sometimes color originals which include images both photographically formed and printed thereon. In such a case, the color original can be partly classified into photographic parts and printed article parts by detecting reflection densities for these parts. For these partial classifications, the present invention can be made applicable. When classifying the color original with both a photographic image and printed image included therein, according to the ratio of areas of the photographic image and the printed image, the location of each image in the color original, and/or the importance of each image, the proper reproducing condition may be selected among the several previously provided reproducing conditions. The classifying method and apparatus according to the present invention can also be utilized to classify black-and-white originals, originals including images made by black printers, or monochrome originals with ease.

What is claimed is:

1. A method of classifying color originals from which images are reproduced into at least color photographs and other color articles, which comprises the steps of:
    measuring light reflected from said color original at different wavelengths within a wavelength band of one of the three primary colors, to detect at least two light reflection values;
    examining said color original by comparing either a difference between or a ratio of said detected light reflection values with a predetermined threshold value; and
    classifying said color original as either a color photograph or another type of color article based on a result of said comparison.

2. A method of classifying color originals from which image are reproduced into at least color photographs and color printed articles, which comprises the steps of:
    measuring light reflected from said color original at different wavelengths within a wavelength band of one of the three primary colors, to detect at least two light reflection values;
    examining said color original by comparing either a difference between or a ratio of said detected light reflection values with a predetermined threshold value; and
    classifying color originals into at least color photographs and color printed articles based on a result of said comparison.

3. A method as defined in claim 2, wherein said one of the three primary colors is red.

4. A method as fined in claim 3, wherein said measuring step is formed by providing at least two light sensors having peak sensitivities at said different wavelengths, said peak sensitivities being at wavelengths of approximately 630±40 nm and 680±40 nm.

5. A method as defined in claim 2, wherein said one of the three primary color is green.

6. A method as defined in claim 5, wherein said measuring step is formed by providing at least two light sensors having peak sensitivities at said different wavelengths, one of said light sensors having a peak sensitivity at a wavelength of approximately 540±15 nm and another of said sensors having a peak sensitivity at a wavelength of approximately 570±15 nm.

7. A method of classifying color originals from which color images are reproduced into at least color photographs and color printed articles, which comprises the steps of:
    measuring light reflected from divisions into which said color original is spatially divided, by means of first and second light sensors having peak sensitivities at different wavelengths within a wavelength band of one of the three primary colors, to detect first and second light reflection values (R1, R2) of said color original for each said division;
    measuring light reflected from said divisions by means of third and fourth light sensors having peak sensitivities at different wavelengths within a wavelength band of another one of the primary colors, to detect third and fourth light reflection values (R3, R4) for each said division;
    comparing said first and second light reflection values for each said division;
    comparing said third and fourth light reflection values for each said division; and
    classifying said color original based on the results of said comparisons.

8. A method as defined in claim 7, wherein said one primary color is red and said another primary color is green.

9. A method as defined in claim 8, wherein said peak sensitivity is at a wavelength of approximately 630±40 nm for said first light sensor, 680±40 nm for said second light sensor, 540±15 nm for said third light sensor, and 570±15 nm for said fourth light sensor.

10. A method as defined in claim 9, wherein said detected light reflection values are reflection densities.

11. A method as defined in claim 9, wherein said color original is classified as a color printed article when having less than a predetermined number of said divisions wherein the difference R3-R4 is less than a first threshold value; and as a color photograph when more than said predetermined number of said divisions have a density difference R3-R4 which is greater than a second threshold value.

12. A method as defined in claim 11, wherein a color original which is not classifiable based on said third and fourth reflection densities is classified as a color photograph when more than said predetermined number of said divisions have a density difference R1-R2 which is smaller than a third threshold value; and as a color printed article otherwise.

13. A method of classifying color originals from which images are reproduced into at least color photographs and color printed articles, which comprises the steps of:
    measuring said color original to detect a reflection density for blue;
    classifying said color original as having a low blue reflection density or as having a middle or high blue reflection density;
    measuring a color original classified to have low blue reflection density to detect a light reflection value for a wavelength between approximately 370 and 430 nm so as to classify a color original having low blue reflection density into a color photograph or color printed article based on said detected light reflection value;

measuring light reflected from said color original classified as having middle or high blue light reflection density by means of light sensors having respectively different spectral sensitivities, to detect at least first and second light reflection values; and examining said color original classified to have middle or high blue reflection density by comparing said detected light reflection values, and classifying such color originals into at least color photographs and color printed articles based on a result of said comparison.

14. A method of classifying color originals from which color images are reproduced into at least color photographs and color printed articles, which comprises the steps of:

measuring light reflected from said color original using first and second light sensors having respective peak sensitivities at different wavelengths within a wavelength band of one of the three primary colors, to detect first and second light reflection values;

measuring light reflected from said color original using third and fourth light sensors having respective peak sensitivities at different wavelengths within a wavelength band of another one of the three primary colors, to detect third and fourth light reflection values;

measuring light reflected from said color original using fifth and sixth light sensors having peak sensitivities at different wavelengths within a wavelength band of the remaining one of the three primary colors, to detect fifth and sixth light reflection values;

comparing said detected first to sixth light reflection values, by color; and classifying said color original into a color photograph or a color printed article based on a combination of the results of said light reflection value comparisons for the three primary colors.

15. A method as defined in claim 14, wherein said comparing step includes examining one of: (1) a difference between light reflection values of the same wavelength band, and (2) a ratio of light reflection values of the same wavelength band.

16. A method as defined in claim 15, wherein said peak sensitivity is at a wavelength of 400±30 nm for said first light sensor, 450±30 nm for said second light sensor, 540±15 nm for said third light sensor, 570±15 nm for said fourth light sensor, 630±40 nm for said fifth light sensor, and 680±40 nm for said sixth light sensor.

17. A method as defined in claim 14, wherein said light reflection values are reflection densities.

18. A method as defined in claim 14, wherein said color original is classified as a color printed article when having at least one spatially divided portion whose blue density as detected by said first light sensor is smaller than a first threshold value, or when having no such portion but having less than a predetermined number of portions which exhibit density difference values between green densities as detected by said third and fourth light sensors which are smaller than a second threshold value; and is classified as a color photograph, if not classified as a color printed article, when having less than said predetermined number of portions exhibiting density difference values between blue densities as detected by said first and second light sensors which are greater than a third threshold value, or when having more than a predetermined number of portions exhibiting density difference values between red densities as detected by said fifth and sixth light sensors which are smaller than a fourth threshold value; and is classified as a color printed article when the color original can not otherwise be classified as a color photograph or color printed color article.

19. A method as defined in claim 18, wherein said first, second, third and fourth threshold values are 0.4, −0.1, 0.2 and 0.1, respectively.

20. A method as defined in claim 19, wherein said predetermined number is 20 percent of the number of said portions.

21. An apparatus for classifying color originals from which color images are reproduced into at least color photographs and color printed articles, said apparatus comprising:

first means having a peak sensitivity at a wavelength between approximately 370 and 420 nm for detecting light reflected from said color original;

second means having a peak sensitivity at a wavelength within a wavelength range of visible light, for detecting light reflected from said color original;

means for comparing values detected by said first and second means; and examining means for examining said color original based on a result of said comparison of said detected values, and classifying color originals into color photographs and color printed articles.

22. An apparatus as defined in claim 21, wherein said second means comprises three light sensors for blue, green and red light wavelengths, respectively.

23. An apparatus as defined in claim 22, wherein said detected values are reflection densities.

24. An apparatus as defined in claim 23, wherein said color original is classified as a color photograph when a density difference between the reflection densities detected by said first and second means is larger than 0.05, and as a color printed article when said density difference is under 0.05.

25. An apparatus as defined in claim 21, wherein said first means includes at least one light sensor having a sensitivity peak near the visible light band.

* * * * *